United States Patent [19]

Holcomb et al.

[11] 4,107,611
[45] Aug. 15, 1978

[54] POLICE PROTECTION METHOD AND APPARATUS

[75] Inventors: Jack N. Holcomb, Galt Towers, Ocean Dr., Fort Lauderdale, Fla. 33308; Hans D. Sylten, Fort Lauderdale, Fla.

[73] Assignee: Jack N. Holcomb, Ft. Lauderdale, Fla.

[21] Appl. No.: 422,275

[22] Filed: Dec. 6, 1973

[51] Int. Cl.$^2$ .............................................. H04B 1/00
[52] U.S. Cl. ...................................... 325/55; 325/64; 325/111; 325/117; 325/311
[58] Field of Search ................... 325/6, 111, 112, 117, 325/119, 311, 55, 64, 16, 312; 340/147 A, 224

[56] References Cited

U.S. PATENT DOCUMENTS

| | | | |
|---|---|---|---|
| 3,134,945 | 5/1964 | Wertheimer | 325/312 |
| 3,270,284 | 8/1966 | Schanbacher | 325/111 |
| 3,289,085 | 11/1966 | Leland | 325/119 |
| 3,290,597 | 12/1966 | Denny et al. | 325/6 |
| 3,364,427 | 1/1968 | Bennett | 325/111 |
| 3,440,635 | 4/1969 | Hull | 325/111 |
| 3,668,526 | 6/1972 | Raskin | 325/64 |
| 3,668,528 | 6/1972 | Huchinson et al. | 325/119 |
| 3,699,443 | 10/1972 | Weger | 325/6 |

*Primary Examiner*—Robert L. Griffin
*Assistant Examiner*—Jin F. Ng
*Attorney, Agent, or Firm*—Herbert C. Schulze

[57] ABSTRACT

This is a method and apparatus for performing such method to provide protection to police officers during the interviewing of witnesses and the investigation of matters, such protection being concerned with protection against false charges of police brutality and the like, and from unexpected attack in which a police officer causes his interrogation to be transmitted to a receiver and recording device located within the police vehicle and in which on emergency occurrences a special signal is transmitted which "locks" into the police vehicle broadcasting system for transmission to police headquarters. This method and apparatus features the use of VHF communications to provide a permanent record of all verbal communications between the police officer and others during investigations.

8 Claims, 12 Drawing Figures

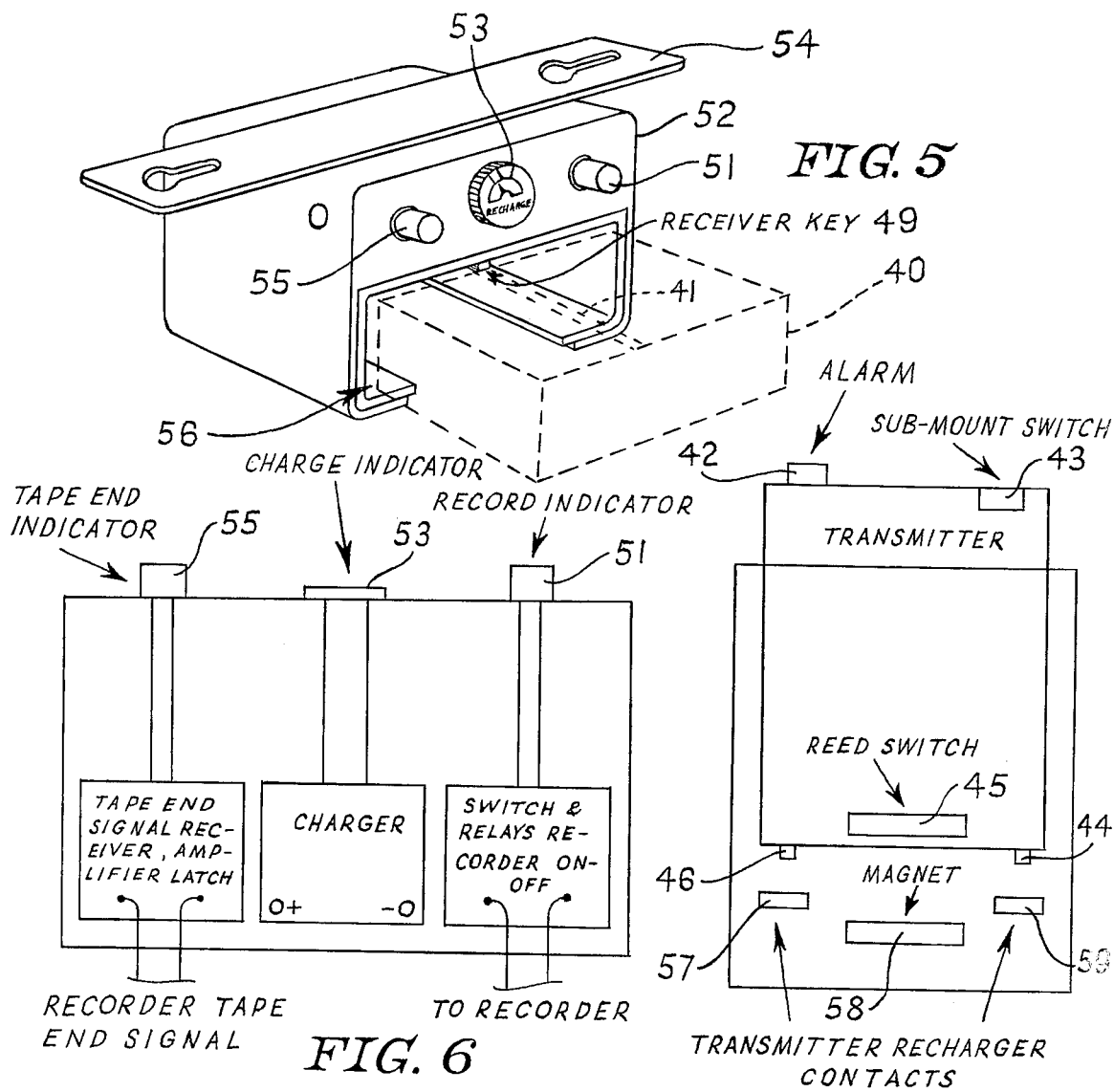
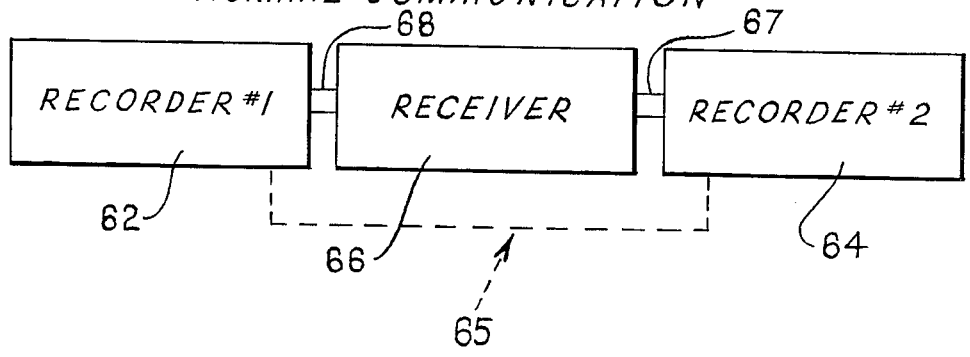

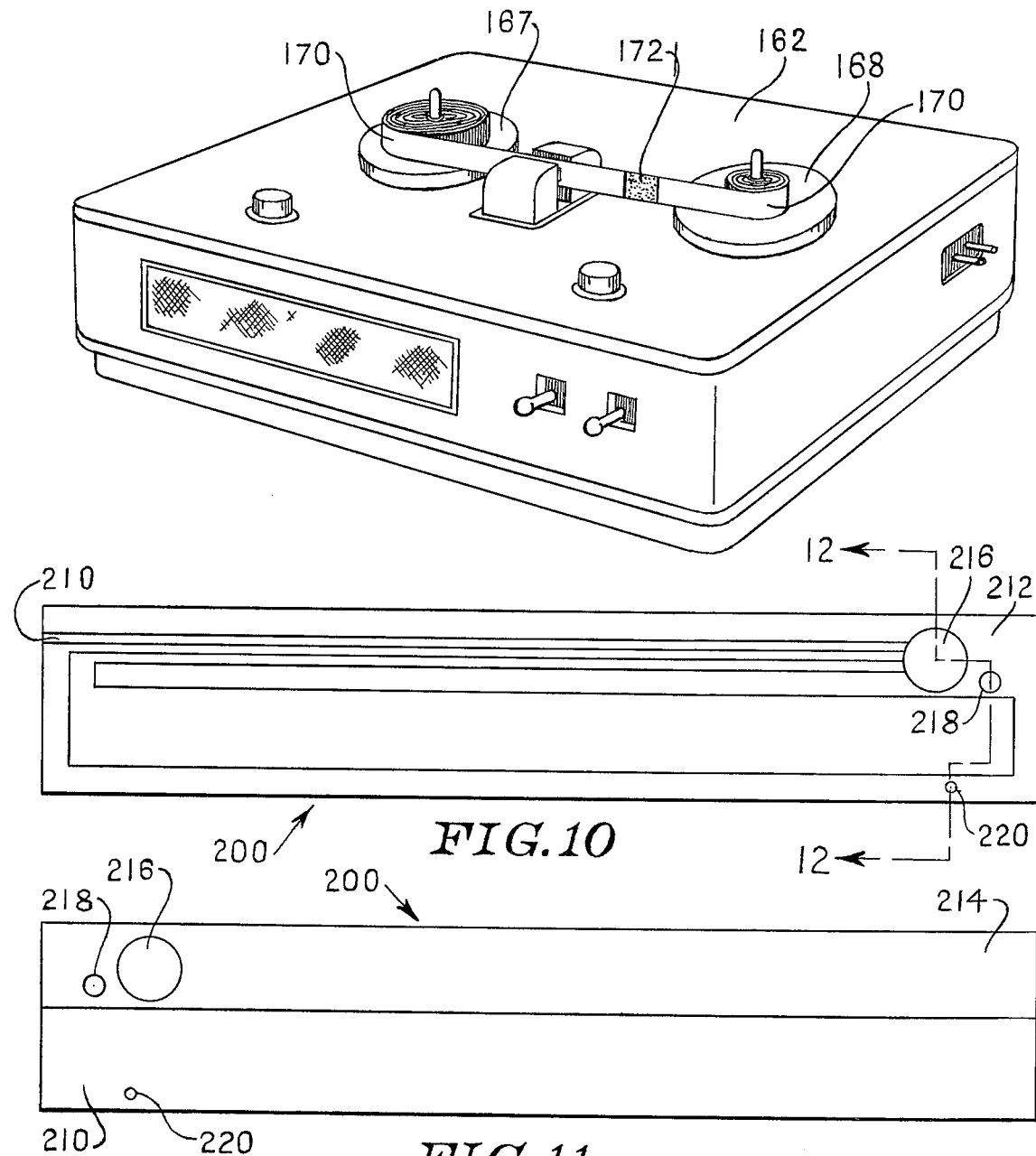
FIG. 9
FIG. 10
FIG. 11
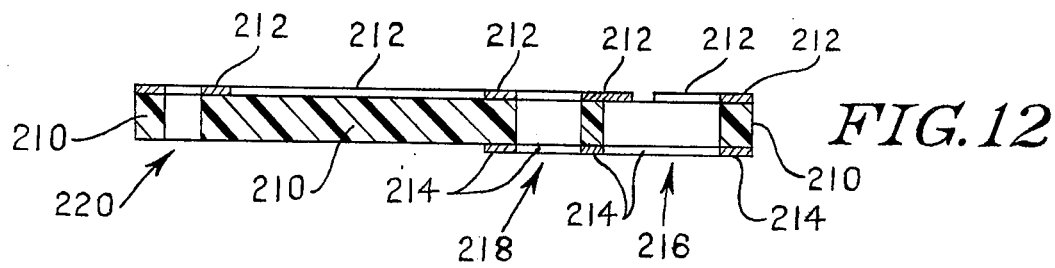
FIG. 12

POLICE PROTECTION METHOD AND APPARATUS

CROSS REFERENCE TO RELATED PATENT APPLICATIONS

There are no related patent applications filed by us.

BACKGROUND OF THE INVENTION

1. Field of the Invention

This invention is in the general field of providing protection to police officers against the numerous false reports of police brutality, perversion, and the like, which are reported by persons interrogated by the police at the scene of a disturbance, or the like, or by witnesses who have been interviewed.

It is more particularly in the field of providing such protection, together with emergency situation alarm by the method of continuous transmission to a receiver at a remote location of all conversation, and the like, taking place during such interviews or investigation.

2. Description of the Prior Art

Until now, the method used by police for protecting themselves against false accusations regarding their conduct, and the like, has consisted of carrying tape recorders on occasion or having a witness present when interrogating persons.

There has been no satisfactory method for complete and accurate transcription of all which takes place in an area before the invention of our method and apparatus, and thus there is no prior art dealing with such a method and apparatus.

SUMMARY OF THE INVENTION

Police, in making routine investigations, investigating incidents in which they have been requested to come to a premise, and the like, are frequently being subjected to charges of improper conduct and brutality.

In most instances, such charges are unfounded and a great deal of manpower is required to investigate thoroughly each such complaint made by persons who claim to have been mistreated or in some manner taken advantage of by the police during routine investigations, and the like.

We have studied this problem thoroughly and have found that such devices as tape recorders, and the like, when used, are of limited value, only, since persons frequently claim that the police have either turned off the recorder or have not made a complete recording, or the like.

Another problem in connection with police interrogations is the necessity of making full and complete notes of facts and circumstances or of attempting to obtain tape recordings, which means the necessity of carrying a tape recorder, or the like, at all times. Such items having sufficient time for recording are cumbersome at best.

We have solved this problem by providing a method and an apparatus for performing the method in which the entire investigative process is recorded without the ability of the police or anyone else to interfere with the complete and accurate recording of the incident.

In our method, a small, shirt pocket transmitter is carried by the policeman when he leaves the car for the purpose of investigating a complaint, or the like. This transmitter is especially tuned to transmit to a matching receiver within the police car and a recorder is coupled to the receiver so that everything picked up by the transmitter and transmitted is recorded. The recorder can be a large recorder with a major amount of recording time, or might be a smaller recorder or two recorders connected so as to pick up excessively long conversations.

The transmitter can be equipped so that it cannot be manipulated or turned off by the police officer or anyone else and in our method, is normally carried within the patrol vehicle in a special carrier which automatically charges rechargeable batteries within the transmitter at all times so as to maintain a full charge and at the same time, while the charging is taking place, the recorder is deactivated.

When the policeman leaves the vehicle, he then removes the transmitter from its holder and places it in his pocket from whence full recording takes place and his act upon so removing the transmitter from the holder automatically commences operation of the recorder.

Another severe problem encountered by police in investigative work or upon apprehending suspects, and the like, is an emergency danger situation. In such situation, the police officer frequently has no way in which he may notify his headquarters that he is in danger. In our method and apparatus, we combine an emergency transmission signal, which is activated by pressing a button, or the like, located upon the transmitter, which immediately triggers a special interfacing arrangement between the normal recording receiver and the patrol car radio used in normal communications with headquarters. An emergency message or signal is then automatically locked into the normal communications system and transmits continuously or for sufficient period of time to attract the attention of the officers' headquarters.

Since the officer always reports in his location at the time of making an investigation, the transmission of the emergency signal makes it possible for additional help to be sent immediately to the location of the officer.

The emergency signal does not, incidentally, interrupt the continued recording of further events taking place upon the premises and thus evidence of the exact circumstances is preserved.

As an important subinvention, we have discovered and developed a means by which we are able to have a totally enclosed transmission antenna within the pocket transmitter. This is the first time such antenna has been conceived and developed and greatly increases the reliability of the unit, as well as the safety of the unit, since the lack of an external aerial means that the positioning of the aerial for proper transmission is unnecessary and the loss of the aerial or its use as a "handle" for a person being interrogated to take hold of to the officer's detriment is eliminated.

It is an object of this invention to provide a method and apparatus by which investigating officers are able to record, remotely and accurately, all activities taking place during an interrogation;

Another object of this invention is to provide a method and apparatus by which a transmitter used in connection with the foregoing mentioned method and apparatus may be constantly recharged when not in use and during such recharging, the recording is automatically stopped;

Another object of this invention is to provide an emergency signaling system for an officer in a difficult and unexpected situation so that assistance will be immediately forthcoming;

Another object of this invention is to provide a method and means for internal antenna for miniature transmitters.

The foregoing and other objects and advantages will be understood by those skilled in the art upon reading the Description of a Preferred Embodiment which follows, together with a review of the appended drawings.

BRIEF DESCRIPTION OF THE DRAWINGS

FIG. 5 is a perspective schematic view of a carier for the transmitter used in this invention;

FIG. 6 is a schematic indication of elements incorporated into the carrier of FIG. 5;

FIG. 7 is a schematic representation of the transmitter activation, deactivation and charging arrangement;

FIG. 8 is a schematic block diagram indicating the inter-relation of the receiver and recorders;

FIG. 9 is a schematic representation of the tape exhaustion warning condition on the tape;

FIG. 10 is a plan view of one side of an antenna arrangement for the transmitter;

FIG. 11 is a plan view of the other side of the internal antenna arrangement for the transmitter; and FIG. 12 is a section on 12—12 of FIG. 10.

DESCRIPTION OF A PREFERRED EMBODIMENT

Figure 1:
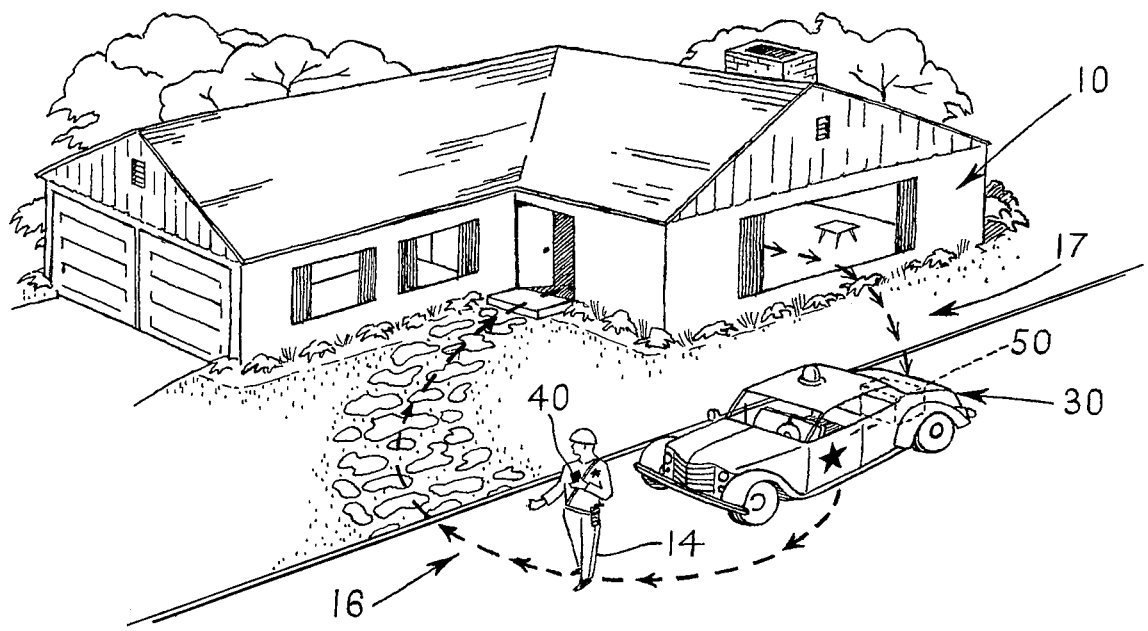
FIG. 1 is a perspective diagrammatic view indicating the operation of this method and the use of the apparatus by a policeman making a routine investigation.

As will be observed from FIG. 1, the policeman 14 on a routine investigation, will leave his vehicle 30 following the method of this invention, and upon leaving his vehicle, will place in his shirt pocket the pocket transmitter 40, which was previously carried within the patrol car. He then enters the premises 10, or other location, by walking along the route 16, for the investigation, and commences his conversation and investigation with those present.

Virtually all sounds within reasonable range of the officer will be picked up by the transmitter and transmitted as indicated by the arrows 17 to a properly tuned VHF receiver, preferably with a six channel capability, which is installed in the police vehicle and connected to an omni-directional antenna, preferably five-eighths wave length. The frequency range of such a receiver, covering a segment of 400 KHz band width can be specified from 150 to 173 MHz center frequency, if desired. The receiver is normally coupled with a recorder and this combination is indicated generally by the numeral 50. Thus, with the matched transmitter and receiver there cannot be errors in transmission and receipt of the messages and the recording thereof. In some cases, it may be desirable to have two recorders coupled together by means known in the art, so that one recorder will automatically transfer and commence operation of the second recorder when its tape is exhausted. Such a system is indicated schematically in FIG. 8 and will be described below.

The recorder actuating circuit may be of customary nature, as is known in the art, which initiates recording of the demodulated information transmitted by the pocket transmitter. The receiver is so constituted as to provide a leveled audio output to the recorder, the magnitude of which is preset to prevent overload of the recorder.

Upon completion of the investigation or interrogation, the officer returns to the patrol car and replaces the transmitter in its holder, thus effectively commencing a new charging cycle for the self-contained batteries within the transmitter and, at the same time, disconnecting the recorder.

The officer, also, immediately checks the tape recording time indicator so as to determine whether tapes should be changed or not.

Figure 2:
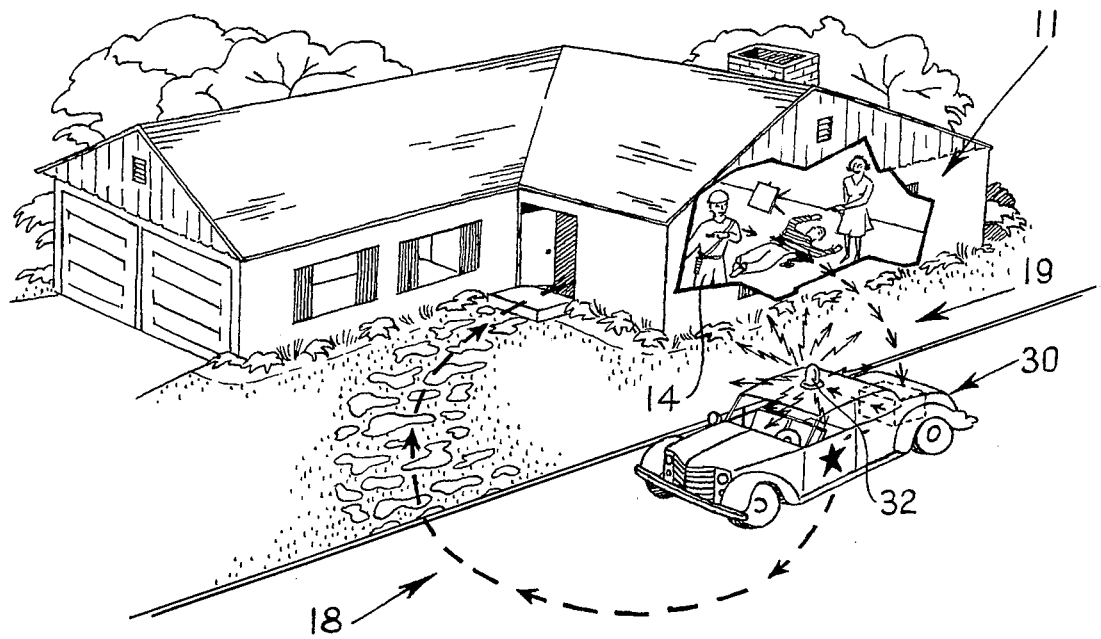
FIG. 2 is a figure similar to FIG. 1, but in which an emergency has ocurred and the policeman is activating the emergency alarm.

Turning now to FIG. 2 and examining particularly that portion indicated by the dotted lines 19, if an emergency exists, or occurs, during the interrogation, the officer will press the special alarm button on his transmitter which can be done inconspicuously. For this purpose, the pocket transmitter will be equipped with a highly stable tone generator consisting of a quartz crystal controlled oscillator and a fourteen-stage binary counter, which in conjunction with each other generate a 250 Hz tone with a stability under the worst environmental conditions less than 0.02 Hz. The 250 Hz square wave from the output of the binary counter is filtered and modified to a triangular wave form. An internal latch circuit maintains operation of the tone generator while voice transmissions can be continued without interruption when the alarm has been momentarily activated.

The 250 Hz silent arlarm tone is filtered from the voice audio circuitry so as to remove it from the continuing recording, thus permitting continued accurate recording of all events taking place when the officer has actuated the alarm. The alarm tone is further processed to actuate the encoder consisting of a complimentary MOS digital integrated circuit arrangement permanently programmed by means of patch cord to generate a code sequence containing the vehicle identification. The transmission of this code sequence can be interfaced with the normal vehicle transceiver which, in this case, would be actuated by the first group of the code and subsequently tone modulated by the encoded identification number. The repetition of the encoded message, approximately ten times, will ensure the interception at a dispatcher's office, or other location, and it is recognized that the repetition is not necessarily fixed at ten times, but could be more or less.

Alternately, the encoded identification of the vehicle could be transmitted by a separate VHF transmitter operating on an exclusive emergency channel. In this case, the actual time of transmission can be reduced since there would be positive identification within this separate system. Further possibilities, by means which will be understood by those skilled in the art, would include the activation of the vehicular emergency light 32 and the like.

Also, it will be understood that under some circumstances, it may be desired not only to record, but to transmit to headquarters or another vehicle, the actual occurrences within the location where the officer is conducting his investigation or interrogation. In this case, a special alternate interfacing may be provided to enable continuous broadcasting from the receiver in the trunk of the vehicle through the normal vehicle communication system.

Figure 3:
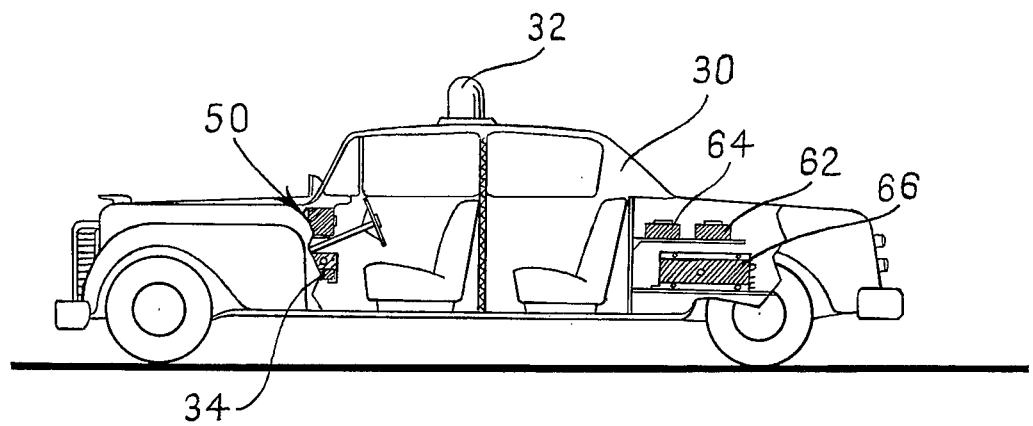
FIG. 3 is a partially broken away side elevation of a police vehicle indicating placement of the essential units for utilization of the method of this invention.

FIG. 3 illustrates certain elements of the vehicle 30 including the vehicle emergency light 32, the transmitter carrying rack 34, the normal transceiver 50, the trunk-mounted receiver 66, together with two tape recorders 62 and 64.

Figure 4:
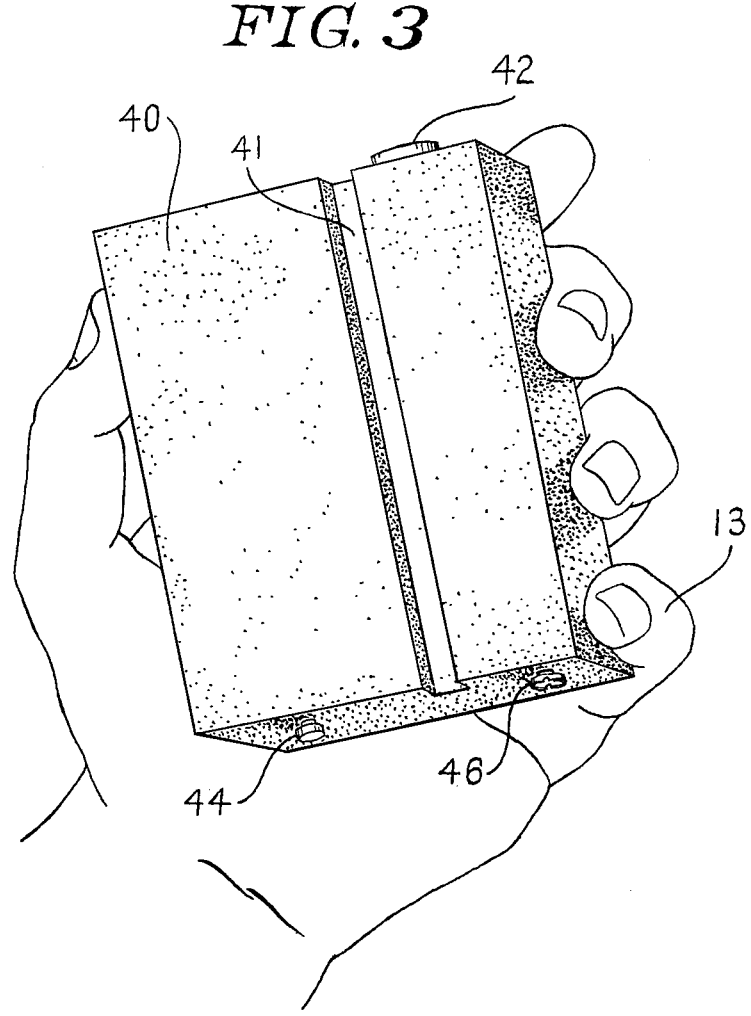
FIG. 4 is a perspective of a preferred embodiment of a transmitter unit to practice the method of this invention.

FIG. 4 illustrates a shirt pocket transmitter 40 held in the hand 13 of the officer and shows the recharging contacts 44 and 46, as well as the emergency alarm button 42. The key slot 41 is provided so that the transmitter can be inserted only in the correct manner into its charging and carrying rack within the vehicle.

FIG. 5 illustrates schematically a preferred embodiment of a charging rack consisting of a case 52 having an appropriate configuration as at 56, or the like, to hold the transmitter 40, having the key slot 41, and the case 52 having appropriate key 49 so that the receiver may be received in one configuration only.

A bracket 54 or the like is provided for mounting within the vehicle and a tape end indicator 55, a record condition indicator 51, and a battery charge indicator 53 are provided. These same elements, 51, 53, and 55 are indicated on FIG. 6 and FIG. 6 further shows by block diagram the positioning of switch and relays relating to the recorder, the charger contacts and the tape end signal receiver, amplifier and latch arrangement, and the like, as will be understood by those skilled in the art.

FIG. 7 illustrates one means of contact for the transmitter charging arrangement, as well as certain other elements. The alarm switch 42, the function of which has previously been dealt with, is shown. Additionally, an alternate, submounted switch 43 is indicated, which would be an override "On" and "Off" switch, if desired for transport of the transmitter when not in charge condition and when not desired for activation. A reed switch, or the like, 45, is provided which is the switch which activates or deactivates the transmitter when in its holder. The magnet 58 will activate and deactivate the reed switch as known in the art and which need not be explained. Two charging elements 57 and 59 connected to a charger by customary means will be contacted by the contacts 44 and 46 for the recharging cycle.

The connection of the receiver to two separate recorders is indicated in FIG. 8. The receiver 66 is connected appropriately by wires 68 to recorder 62 and by wires 67 to recorder 64. An interconnection 65 between recorders 62 and 64 will alternately activate and deactivate them upon completion of the tape on one and desirability of commencing the tape on the other by means known in the art.

An important subinvention is an alarm means connected to the recording tape being used. Normally the recording tape being used will be of a cassette type, suxh as is well-known in the art and is customarily used and available or a reel type as in FIG. 9. In using this invention the cassette tape or reel tape 170 will have a contact 172 or the like, at a point intermediate its ends preferably when there is about five minutes left.

The particular illustration shown shows a reel type tape recorder 162, the details of which are known in the art, having the two reel positions 167 and 168, with the tape 170 being transferred between them. The contact point 172 is of foil or the like, and is at an appropriate place intermediate the ends. We recognize that there have been inventions utilizing a foil or the like contact at the extreme end of the tape which sounds an alarm or makes other activity when the total end of the tape has been reached. At the same time, we feel that placing this warning before the end of the reel is reached as indicated here is an entirely different advocation of this principle and is inventive and does achieve a new result which is the ability to have plenty of time to switch to a different tape recorder or the like before running out of tape. In the previously end alarms, the tape has been exhausted before the alarm point is reached.

When the tape contact point is reached a special signal will be generated, amplified and latched in condition to activate the tape end warning indicator 55, which has previously been described. In this way, the second tape recorder, or replacing of tape manually, if desired, may take place prior to complete exhaustion of the tape so that nothing is lost in the recording, not even a moment.

When the recorder is operating, the record indicator 51 will be activated thus monitoring may take place by additional personnel, if desired.

The receivers and recorders obtain their primary power from the vehicular battery system through a regulated circuit to provide adequate protection to the electronic components. The pocket transmitter will receive its power from high-charge rate, nickel cadmium batteries, which will be constantly recharged when the transmitter is in its carrying and charging rack, as indicated. During these periods, of course, by the means previously indicated, or by other suitable means, the transmitter circuit is disconnected so the transmitter is not active. The removal of the transmitter from the rack immediately institutes transmission and it is contemplated that the transmitter will be carried by the officer from the vehicle upon each excursion for investigation, or the like.

The modulator of the transmitter preferably provides a usable, dynamic range of 75 db assuring constant deviation over a wide range of sound levels. An effective power of 1.0 Watt paired with a resonated, internal loop antenna generates adequate R.F. signal magnitudes under a variety of propagation conditions encountered in police work.

The internal antenna arrangement is an important subinvention. We conceived the method of transmitting by internal antenna because of the problems frequently encountered with external antenna. An external antenna worn on the person wherein a small transmitter is used, must be especially designed and located upon the body in order to compensate for the human body capacitance and other factors. This requires, usually, special taping of the antenna to a particular area of the body, or the like. Such a system would, of course, be cumbersome and time consuming and would delay the officer each time he prepares himself to make the interrogation. Frequently, such as at an accident, or the like, he may be in such a hurry that this would not be feasible. Additionally, the external antenna can become detached, or its presence can give a means for a person being interrogated, or desiring to do harm to the officer, for the removal very easily of the transmitter or the grabbing of the officer by such a device attached to the transmitter.

We conceived that it would be possible, and have proceeded, to develop a transmitter for this method utilizing an internal antenna. While it is particularly adapted to this method, it is our opinion that a method of transmitting utilizing internally mounted antenna is a subinvention worthy of particular note of its own and possibly of considerable value in other areas of transmission.

FIGS. 10, 11 and 12 illustrate a preferred embodiment of an internal antenna to be used in the method of this invention.

The antenna 200 is composed of a fiber-glass reinforced epoxy member 10 having a silver plated copper printed circuit arrangement 212 on one side and silver plated copper printed circuit arrangement 214 on the other side.

There are three holes 216, 218, and 220 extending through the base 210 and the printed circuit portions as indicated.

This particular internal antenna as indicated in the drawings is not, necessarily, restricted as to an exact size and configuration, but the particular size and configuration works extremely well. These drawings illustrate our preferred configuration at this time in approximately double scale in FIGS. 10 and 11 and triple scale in FIG. 12.

In the event the scale for this particular antenna is altered by a reduction in size in the printing of the patent which ultimately issues from this application, the following description of sizes, from which the other factors can be scaled, is given for an excellent working item: the overall length of the antenna as indicated in FIGS. 10 and 11 is approximately 3 3/16 inches. The overall width is approximately ¾ inch. The hole 216 is approximately ¼ inch in diameter, the hole 218 is approximately 3/32 inch in diameter, and the hole 220 is approximately 1/16 inch in diameter.

The thickness of the fiber-glass reinforced epoxy base is approximately 1/16 inch, and the silver plated copper material is approximately 1/64 inch in thickness.

The portion of the antenna represented by the area 214 and the corresponding portion of 212 on the reverse side is so constructed for the specific purpose of eliminating the characteristic figure 8 radiation pattern common to simple resonated loop antennas caused by field cancellation from currents in short parallel conductors in one axis. The impedance of the strip line, described is approximately equal to 140 ohms. This particular measure supresses radiation such that the electro-magnetic field is set up mainly by the remaining portion of the silver plated copper area 212 in FIG. 10, that portion being the portion not directly opposite the area 214 on the reverse side.

The tap point 220 has been chosen to provide a close match to the coaxial transmission line, being the portion through which it penetrates, which in turn is fed by the transmitter. A capaciter at 216–218 permits resonance adjustments of the antenna within the limits of the intended operating frequency of the system.

A common ground connects from tap point 220 to the silver plated copper portion 214.

The particular antenna shown and described generates a uniform field with an intensity variation of less than 3 d.b. over 360°, while a non-compensated loop antenna exhibits intensity reductions at the nulls of a figure 8 pattern of up to 40 db.

While the particular embodiments of this invention shown and described are fully capable of achieving the objects and advantages desired, it is to be understood that such embodiments are for purposes of illustration only, and not for purposes of limitation.

We claim:

1. The method for providing the record of interrogation and activity by police officers, and protection to such officers, during investigations, including: a. replacement of an automatically activated transmitter in the officer's clothing; b. interrogation of an individual by an officer while carrying said transmitter; c. transmission by said transmitter to a receiver especially tuned to the wave length of the transmitter and located at a distance from said transmitter; d. recording the received transmission by means of a tape recorder operating in conjunction with, and receiving through, the receiver, the transmission from the transmitter; e. preserving the recording thus obtained for use in the future.

2. The method of claim 1 in which an emergency transmission of a special signal is made in the event an emergency situation arises.

3. The method of claim 2 in which the emergency signal is received by the receiver, and in which the receipt thereof causes the receiver to activate emergency signaling on another communication system.

4. The method of claim 1 in which the said recorder and transmitter are deactivated at the termination of the interrogation or investigation.

5. An apparatus for providing police protection including in cooperative combination, a miniature transmitter suitable to be carried upon the person; a holder for said transmitter suitable to be carried in a vehicle; means cooperative between said holder and said transmitter to disconnect said transmitter upon being placed in said holder and to automatically commence charging the said transmitter's power supply, and to disconnect a recorder connected thereto by means suitable to activate or deactivate the same; a recorder attached to said means to activate and deactivate the same; a receiver connected to said recorder, said receiver being so designed as to receive transmission from the aforementioned transmitter and to place the same through the interconnection into said recorder.

6. The device of claim 5 in which an emergency signal generator is incorporated within the transmitter with means to activate the same.

7. The device of claim 6 in which the said receiver has means connected between itself and another communication system to activate the other communications system upon receipt of the emergency signal.

8. The device of claim 7 in which the other communication system is an automotive vehicle communication system in which the said receiver is located.

* * * * *